United States Patent

Ueda et al.

[11] Patent Number: 6,038,442
[45] Date of Patent: Mar. 14, 2000

[54] COMMUNICATION SYSTEM

[75] Inventors: Hitoshi Ueda; Shoji Tanaka, both of Tokyo, Japan

[73] Assignee: NEC Corporation, Tokyo, Japan

[21] Appl. No.: 09/045,788

[22] Filed: Mar. 23, 1998

[30] Foreign Application Priority Data

Mar. 24, 1997 [JP] Japan ................................ 9-069885

[51] Int. Cl.⁷ .............................. H04Q 7/24; H04M 1/57
[52] U.S. Cl. .................... 455/414; 455/433; 455/417; 455/411; 455/440; 455/456; 379/211; 379/212
[58] Field of Search ..................... 455/433, 435, 455/440, 456, 414, 405, 407, 411, 417; 379/211, 212

[56] References Cited

U.S. PATENT DOCUMENTS

| | | | |
|---|---|---|---|
| 4,757,529 | 7/1988 | Glapa et al. | 379/244 |
| 5,724,408 | 3/1998 | Morganstein | 379/211 |
| 5,809,128 | 11/1996 | McMullin | 379/211 |
| 5,878,347 | 6/1996 | Joensuu et al. | 455/433 |
| 5,905,953 | 12/1996 | Liu et al. | 455/433 |
| 5,930,700 | 11/1996 | Pepper et al. | 455/414 |
| 5,943,607 | 10/1996 | Singer | 455/417 |

FOREIGN PATENT DOCUMENTS

| | | |
|---|---|---|
| 2-95037 | 4/1990 | Japan . |
| 3-283898 | of 1991 | Japan . |
| 5-308674 | 11/1993 | Japan . |
| 6-209489 | 7/1994 | Japan . |
| 7-129488 | 5/1995 | Japan . |
| 7-162942 | 6/1995 | Japan . |
| 7-264653 | 10/1995 | Japan . |

OTHER PUBLICATIONS

S. Tabbane, et al. "An Intelligent Location Tracking Method for Personal and Terminal FPLMTS/UMTS Communications", International Switching Symposium, Apr. 1995, vol. 1, pp. 4–8.

"Personal Digital Cellular Telecommunication System", ARIB Standard.

GSM (Global System for Mobile Communication), Jul. 1, 1993.

TIA/EIA/IS–95–A, "Mobile Station–Based Station Compatibility Standard for Dual–Mode Wideband Spread Spectrum Cellular System", May 1995.

*Primary Examiner*—Wellington Chin
*Assistant Examiner*—Simon Nguyen
*Attorney, Agent, or Firm*—McGinn & Gibb, P.C.

[57] ABSTRACT

Each of communication terminals for use in a communication system which performs voice communications and data communications has an individual database which manages mobility information of its own and other communication terminals. The mobility information managed by the individual database includes subscriber numbers, subscribers' names, authentication numbers, date and time information, incoming call destination priority information, terminal types, location registration information, incoming call addresses, etc. of its own and other communication terminals.

11 Claims, 7 Drawing Sheets

COMMUNICATION SYSTEM

BACKGROUND OF THE INVENTION

1. Field of the Invention

The present invention relates to a communication system capable of performing voice communications and data communications using communication terminals such as personal computers with a built-in telephone function and personal computers that can be connected to telephone sets (hereinafter referred to as a "fixed terminal") and mobile telephone terminals with an information processing capability (hereinafter referred to as a "mobile terminal")

2. Description of the Related Art

One of the conventional mobility management processes is a location updating process for mobile communications. Known location updating processes are those disclosed in Japanese laid-open patent publications Nos. 264653/95, 162942/95, 129488/95, 209489/94, 283898/91, and 095037/90, and a GSM (Global System for Mobile communications) process, a PDC (Personal Digital Cellular) process, and an IS-95 process. These location updating processes will be described below. FIG. 1 of the accompanying drawings shows a communication system in which a location updating process is carried out.

Mobile communication systems employ location registration areas provided for each operator or each predetermined geographical range. When the mobile terminal of a subscriber is switched on for the first time in a location registration area or moves from a location registration area into another location registration area, the mobile terminal sends a location registration change request to a database which is composed of location registers including a home location register (HLR) and a visitor location register (VLR). The database stores location registration information associated with mobile terminal numbers. When there is an incoming call for a mobile terminal, the database searches the location registration areas for the mobile terminal, and calls the mobile terminal in the location registration area which is determined. If a roaming service is available between different operators, then even when a mobile terminal roams into a service area of an operator to which the mobile terminal does not subscribe, the location registration information in the HLR of the home operator and the location registration information in the VLR of the operator which provides the roaming service can be updated by a location registration change request from the mobile terminal. While the mobile terminal is roaming, the mobile terminal is temporally allotted a roaming number for its own identification, and managed by the database. Therefore, no matter which service area a mobile terminal may be located in, its location registration information is updated, allowing connecting incoming calls to the mobile terminal.

In FIG. 1, a mobile terminal 505 subscribes to an operator which covers a service area 510, and information of the mobile terminal 505 is managed in a database (HLR) 500. When the mobile terminal 505 moves from a location registration area 511 into a location registration area 512, the mobile terminal 505 sends a location registration change request to a database (VLR) 504 via a mobile switching office 502. The database (VLR) 504 sets up location registration information and allots a roaming number, and notifies the database (HLR) 500. In response to the notification from the database (VLR) 504, the database (HLR) 500 updates the location registration information of the mobile terminal 505 and sets up the roaming number thereof. When an incoming call for the mobile terminal 505 arrives at a mobile switching office 501, the mobile switching office 501 sends a location information inquiry to the database (HLR) 500. The mobile switching office 501 confirms that the mobile terminal 505 is located in a location registration area 512 covered by the mobile switching office 502, acquires the roaming number for the incoming call, and connects the incoming call to the mobile switching office 502. In response to the incoming call from the mobile switching office 501, the mobile switching office 502 sends an inquiry about the mobile terminal 505 to the database (VLR) 504, using the roaming number, and acquires a location registration area in which the mobile terminal 505 is located and a mobile terminal number (which may be a temporary number for concealing its real number). The mobile switching office 502 calls the mobile terminal 505 in an area to be called (which is usually the same as the location registration area). If someone answers with the mobile terminal 505, the mobile switching office 502 connects an incoming call circuit from the mobile switching office 501 and the communication path of the mobile terminal 505, for communications to start between the calling and called parties. When an outgoing call is made from a mobile terminal, a location registration change request may automatically be sent from a mobile switching office to a location register.

Japanese laid-open patent publication No. 264653/95 discloses a dual-mode system for a cordless terminal and a mobile terminal. When switched to a slave unit of the cordless terminal, the wired telephone number of a master unit of the cordless terminal is registered as a call forwarding destination in a location register of a mobile communication system. When there is an incoming call for the mobile terminal, an incoming call is rerouted to the master unit of the cordless terminal.

According to Japanese laid-open patent publication No. 162942/95, where there are a plurality of mobile switching offices for routing control in one location registration area, a routing number for a terminal in a location register is updated when a call is disconnected, so that the routing number can be updated into an optimum routing number in the same location registration area.

Japanese laid-open patent publication No. 129488/95 reveals location updating between private networks for private mobile communications.

In the disclosure of Japanese laid-open patent publication No. 209489/94, when terminals concentrate in the area covered by a certain control station, control is divided between a management station which manages positional information in an entire service area and the control station for thereby preventing congestion.

Japanese laid-open patent publication No. 283898/91 shows a system having a plurality of home location registers. If there are many communications performed in a visitor area outside a home area, then a terminal is controlled as if it were located within the home area, using a home memory in the visitor area, so that access to a home location register of its own is reduced to prevent congestion.

According to Japanese laid-open patent publication No. 095037/90, location registration information is locally shielded in radio base stations, and when there is an incoming call, the incoming call information is transferred to all the base stations, which determine whether a call is to be made or not based on the incoming call information.

GSM allows location registrations to be canceled and started. Either version of GSM is a mobility management system using location updating as described above with reference to FIG. 1.

One conventional mobility management process is a location tracking process for personal communications. This mobility management process is disclosed in Japanese laid-open patent publication No. 308674/93 and an article entitled "An intelligent location tracking method for personal terminal FPLMTS/UMTS communications". The location tracking process will be described below with reference to FIG. 2 of the accompanying drawings. In personal communications, each individual has a number, and performs a tracking process. A plurality of items of information as to which terminal is used to communicate in each of months, days, weeks, and times are registered as action schedules of individuals. When there is an incoming call, a terminal is called on the basis of the registered information. Tracking information is managed by a home database, and includes individual's numbers and individual's authentication numbers as individual's information and a plurality of incoming call terminal numbers as action schedules.

In FIG. 2, a database 604 belongs to an switching network 600 of an individual ABC. It is assumed that the database 604 manages, as part of subscriber's information, an individual's number "123", an individual's authentication number "556677", a first candidate terminal number "306111" as the number of a fixed terminal 606 scheduled to communicate in a certain day at a certain time, and a second candidate terminal number "307111" as the number of a fixed terminal 607, as shown in Table 1 below.

TABLE 1

| Individual's name | ABC |
|---|---|
| Individual's number | 123 |
| Individual's authentication number | 556677 |
| 1st candidate terminal | Fixed terminal 606 |
| 1st candidate terminal number | 306111 |
| 2nd candidate terminal | Fixed terminal 607 |
| 2nd candidate terminal number | 307111 |

When there is an incoming call for the subscriber ABC at this time from a transmitting switching network 601, the incoming call is sent to the switching network 600. The switching network 600 searches the home database 604 for a present incoming call destination, using the individual's number "123" of the subscriber ABC as a parameter, and attempts to make a call with the first candidate terminal number "306111", obtained from the database 604, which is the number of the fixed terminal 606. It is assumed that an switching network 602 is a first incoming call destination network to which the fixed terminal 606 belongs. If the fixed terminal 606 is busy or no one answers at the fixed terminal 606, then the switching network 600 obtains the second candidate terminal number "307111", which is the number of the fixed terminal 607, from the database 604, and attempts to make a call with the second candidate terminal number "307111". It is assumed that an switching network 603 is a second incoming call destination network to which the fixed terminal 607 belongs. If the fixed terminal 607 answers, then the switching network 600 sets up a connection between the switching networks 601 and 603, allowing the calling and called parties to communicate with each other.

The article entitled "An intelligent location tracking method for personal terminal FPLMTS/UMTS communications" describes that after location updating of a subscriber has been studied for a certain period of time, location tracking pattern information of highest probability is generated.

The conventional location updating processes have suffered various problems.

The first problem is that the conventional location updating processes require a large amount of communications between exchanges and a home database, typically a home location register, which stores information (such as location registration information) of communication terminals, resulting in a reduction in the processing capability. Reasons for the first problem are that the present location updating processes are applicable to mobile communication networks only, and for communicating with a certain mobile communication terminal, an exchange necessarily accesses the home database and calls the mobile communication terminal based on location registration information thereof which is obtained from the home database.

The second problem is that there are instances in which a mobile communication terminal may not be called and ineffective calling may be made even if the mobile communication terminal is located in a location registration area which has last been updated. The second problem arises because the mobile communication terminal may sometimes be located in a building and cannot be accessed by radio waves. Since the mobile communication terminal does not reply when it is called in such an occasion, the calling party hears an announcement of absence from the network, and may find it necessary to call another mobile communication terminal which the calling party can expect to communicate with.

According to the third problem, a mobile communication terminal cannot be called and ineffective calling is made if the mobile communication terminal is not present in a network which is subject to location updating and is present in a network which is not subject to location updating. The third problem occurs because the present location updating processes are applicable to mobile communication networks only, but not fixed wired networks. Even if a fixed communication terminal is present in a location where no mobile communication network services are available, since a calling subscriber makes a call to an updated area where the mobile communication terminal has been last present and the mobile communication terminal does not reply as it is not in the updated area, the calling subscriber cannot communicate with the mobile communication terminal unless he obtains the number of the fixed communication terminal and calls the fixed communication terminal.

The fourth problem is that the ineffective calling due to the second and third problems may be avoided by a detaching process in which a home location register is notified of an absence when a mobile communication terminal enters an area not accessible by radio waves or is switched off, but the detaching process results in increased signal traffic between mobile communication terminals and the network, causing congestion. This is because a mobile communication terminal may enter an area of weak field intensity, but may not necessarily stay in such an area not accessible by radio waves. The mobile communication terminal initiates the detaching process when it enters an area where the field intensity is lower than a certain preset level and initiates an attaching process when the field intensity becomes higher than the preset level. Consequently, the mobile communication terminal tends to repeat the detaching and attaching processes alternately when it is moves between a radio zone where the field intensity is unstable and a boundary region of such a radio zone.

The fifth problem is that the present location updating processes are liable to incur a lot of expenses for communications. Specifically, inasmuch as the present location updating processes are applicable to mobile communication networks only, but no fixed wired networks, an incoming call arrives at a mobile communication terminal via a mobile communication network though a fixed communication terminal is readily available. To prevent such a condition, it is necessary for a subscriber to tell people who are likely to make a call, the number of the fixed communication terminal most readily available to the subscriber. However, such a solution results in an increased expenditure of time and money for communications.

The sixth problem is that the conventional location tracking process is apt to cause many wasteful incoming calls. Specifically, while a subscriber is in motion, it is not possible to set up accurate information to be tracked, and due to a change in schedule, tracking information including a tracking sequence is not in conformity with a location where the subscriber is present, with the results that no one may response to an incoming call or the subscriber may not be present even if an incoming call is answered. In some cases, the subscriber may be present at the final incoming call destination on the tracking list, and an incoming call may not reach the subscriber.

SUMMARY OF THE INVENTION

It is an object of the present invention to provide a communication terminal which is capable of reducing the amount of communications between an exchange and a home database for thereby increasing the processing capability of the exchange.

Another object of the present invention is to provide a method of calling a subscriber while reducing unnecessary calling and tracking control and increasing the quality of services available to the subscriber.

Still another object of the present invention is to provide a method of updating mobility information.

According to the present invention, there is provided a communication terminal for use in a communication system for performing voice communications and data communications, comprising an individual database for managing mobility information including (a) a subscriber number of a subscriber, (b) a type of a registered communication terminal owned by the subscriber, (c) incoming call destination priority information for determining a priority rank for the registered communication terminal to receive an incoming call, (d) present location registration information of the registered communication terminal if the registered communication terminal is a mobile terminal, (e) an incoming call address of the registered communication terminal, (f) tracking control information as to whether an incoming call is to be received by a communication terminal having a next priority rank if the registered communication terminal is incapable of communication, (g) the information (a)–(f) classified according to dates and times, (h) a subscriber number, registered by the subscriber, of at least one other subscriber, and (i) the information (a)–(f) of the at least one other subscriber.

According to the present invention, there is also provided a method of calling a subscriber in a communication system which performs voice communications and data communications using a communication terminal which comprises an individual database for managing mobility information including (a) a subscriber number of a subscriber, (b) a type of a registered communication terminal owned by the subscriber, (c) incoming call destination priority information for determining a priority rank for the registered communication terminal to receive an incoming call, (d) present location registration information of the registered communication terminal if the registered communication terminal is a mobile terminal, (e) an incoming call address of the registered communication terminal, (f) tracking control information as to whether an incoming call is to be received by a communication terminal having a next priority rank if the registered communication terminal is incapable of communication, (g) the information (a)–(f) classified according to dates and times, (h) a subscriber number, registered by the subscriber, of at least one other subscriber, and (i) the information (a)–(f) of the at least one other subscriber, the method comprising the steps of entering the subscriber number of the other subscriber, to which a call is to be transmitted, from the communication terminal of the subscriber, inquiring about mobility information of the other subscriber, which is stored in an individual database of the other subscriber, based on the entered subscriber number via a communication network to acquire the mobility information of the other subscriber, updating mobility information of the other subscriber, which is stored in the individual database of the subscriber, based on the acquired mobility information of the other subscriber, checking incoming call destination priority information based on the updated mobility information of the other subscriber in the individual database of the subscriber, and acquiring an incoming call address of a communication terminal which has a first priority rank, and calling the other subscriber via the communication terminal which has the acquired incoming call address.

If the subscriber is incapable of communicating with the communication terminal which has the acquired incoming call address, tracking control information of the communication terminal is checked, and if the tracking control information represents tracking control, an incoming call address of a communication terminal whose incoming call destination priority information represents a next priority rank is acquired, and the other subscriber is called via the communication terminal having the acquired incoming call address.

Because mobility information which has heretofore been managed by a home database is managed by individual databases of respective subscribers, the amount of communications between exchanges and the home database is reduced.

Since the individual databases of respective subscribers manage the latest mobility information at all times, when a subscriber wants to communicate with another subscriber, the subscriber calls the other subscriber via a communication terminal with which the other subscriber will receive the call with highest probability, with the result that unnecessary calling and tracking control can be reduced.

Inasmuch as the communication terminal with which the other subscriber will receive the call with highest probability is automatically called, the subscriber is not required to consider which communication terminal should be called.

Because another communication terminal managed by the mobility information in the individual database is automatically called, when there is no response to a call to the other subscriber, the subscriber does not need to call again a different communication terminal.

When a mobile terminal owned by the subscriber is switched on or moves from a location registration area into another location registration area, a request to update mobility information is transmitted from the mobile terminal to a mobile terminal having an individual database, and the mobility information of the subscriber which is stored in the individual database of the subscriber is updated.

When the subscriber inserts a portable subscriber information memory card which carries the same information as the mobility information in the individual database into the communication terminal, a request to update mobility information is transmitted from the communication terminal to another communication terminal having an individual database, and the mobility information of the subscriber in the other individual database is updated.

The request to update mobility information is transmitted from the mobile terminal of the subscriber simultaneously to other subscribers registered in the individual database of the subscriber, and the mobility information of the subscriber in individual databases of mobile terminals of the other subscribers is updated in response to the request to update mobility information.

When the subscriber changes communication terminals, another communication terminal having an individual database is accessed via telephone to update the mobility information of the subscriber in the other individual database.

When the subscriber receives an incoming call from the other subscriber registered in the individual database thereof, mobility information of the other subscriber is received, and the mobility information of the other subscriber stored in the individual database of the subscriber is automatically updated.

The mobile information of the subscriber stored in the individual database thereof may be manually updated.

The mobile information of the other subscriber which is stored in the individual database of the subscriber may be manually updated.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
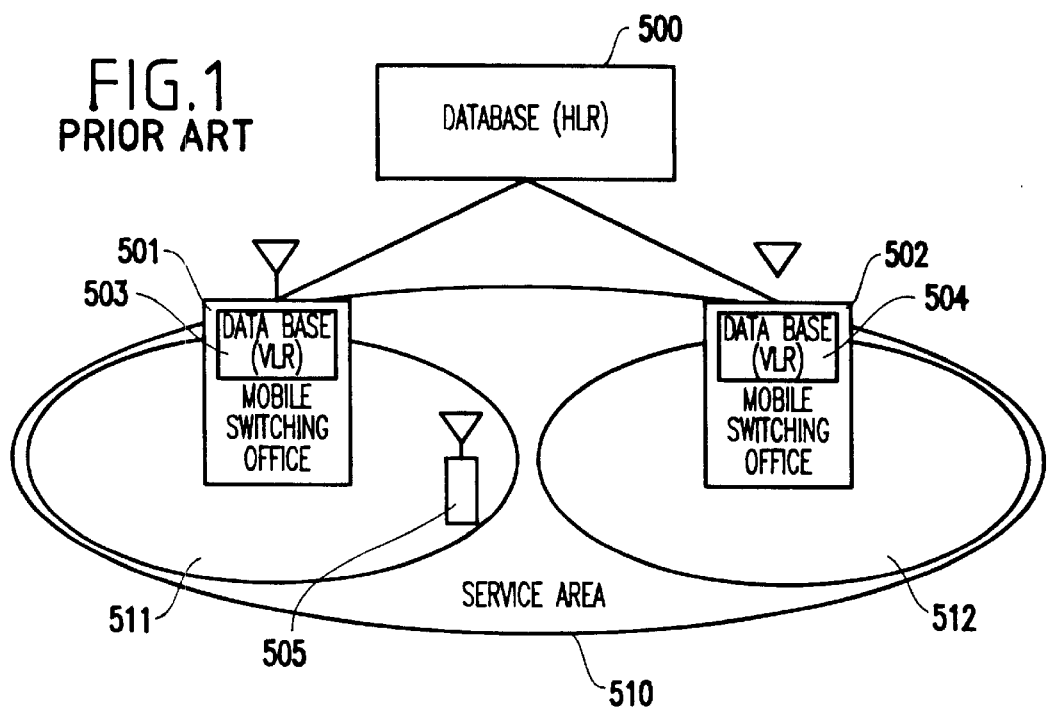
FIG. 1 is a block diagram of a communication system which carries out a conventional location updating process.
Figure 2:
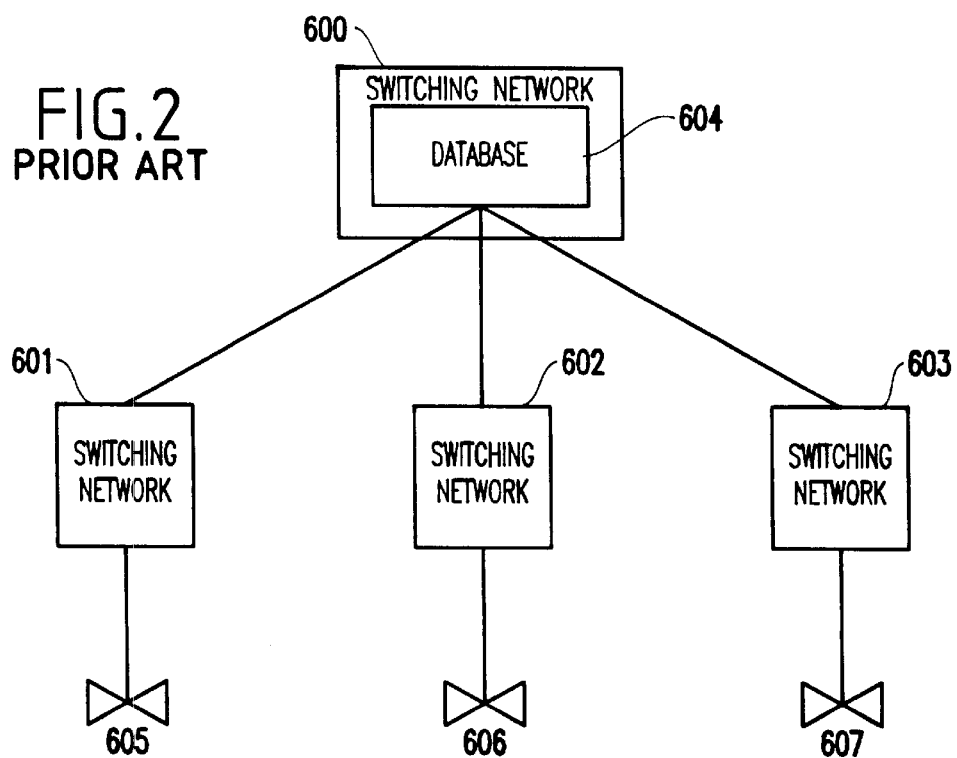
FIG. 2 is a block diagram of a communication system which carries out a conventional location tracking process.
Figure 3:
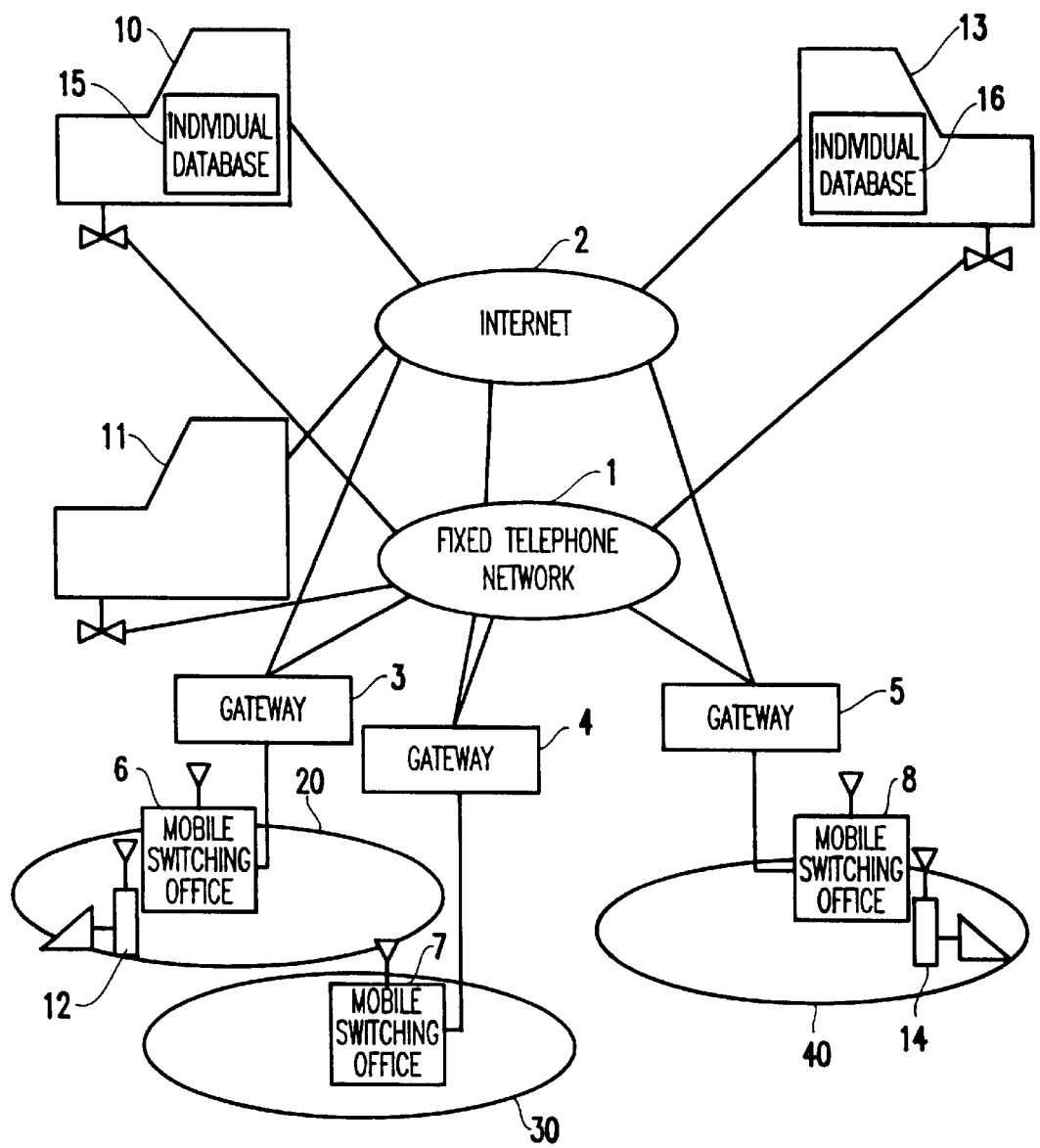
FIG. 3 is a block diagram of a communication system according to an embodiment of the present invention.

As shown in FIG. 3, a communication system according to an embodiment of the present invention basically comprises a fixed telephone network 1, an Internet 2, gateways 3, 4, 5, mobile switching offices 6, 7, 8, fixed terminals 10, 11, 13, and mobile terminals 12, 14. The communication system allows subscribers A, B to carry out voice communications and data communications.

The subscriber A has the fixed terminal 10, the fixed terminal 11, and the mobile terminal 12, and the subscriber B has the fixed terminal 13 and the mobile terminal 14. The fixed terminal 10 has a individual database 15 of the subscriber A incorporated therein which manages mobility information of the fixed terminal 10, the fixed terminal 11, and the mobile terminal 12 and mobility information of the other subscriber B. Similarly, the fixed terminal 13 has a individual database 16 of the subscriber B incorporated therein which manages mobility information of the fixed terminal 13 and the mobile terminal 14 and mobility information of the other subscriber A.

Table 2 given below shows, by way of example, the mobility information (before being updated) stored in the individual database 15 of the subscriber A. The individual database 15 manages, as the mobility information of the subscriber A, a subscriber number, a subscriber's name, date and time information, incoming call destination priority information, terminal type, location registration information, incoming call address, and tracking control information, and also manages mobility information of the other subscriber B and subscribers C, D, . . . (omitted from Table 2).

TABLE 2

| | |
|---|---|
| Subscriber number | 1234567 |
| Subscriber's name | A |
| Date and time | @@ (day), ## (month) 8:30–17:15 |
| Incoming call destination priority | 1st priority |
| Terminal type | Fixed terminal 10 |
| Location registration information | None |
| Incoming call address | 0471857162 |
| Tracking control information | Next track upon no answer |
| Incoming call destination priority | 2nd priority |
| Terminal type | Mobile terminal 12 |
| Location registration information | Location registration area 20 |
| Incoming call address | 0301111111 |
| Tracking control information | Next track upon no answer |
| Incoming call destination priority | 3rd priority |
| Terminal type | Fixed terminal 11 |
| Location registration information | None |
| Incoming call address | 0486681950 |
| Tracking control information | Not next track upon no answer |
| Date and time | @@ (day), ## (month) 17:15–8:30 |
| Incoming call destination priority | 1st priority |
| Terminal type | Fixed terminal 11 |
| Incoming call address | 0486681950 |
| Location registration information | None |
| Tracking control information | Next track upon no answer |
| Incoming call destination priority | 2nd priority |
| Terminal type | Mobile terminal 12 |
| Location registration information | Location registration area 30 |
| Incoming call address | 0301111111 |
| Tracking control information | Next track upon no answer |

TABLE 2-continued

| | |
|---|---|
| Incoming call destination priority | 3rd priority |
| Terminal type | Fixed terminal 10 |
| Location registration information | None |
| Incoming call address | 0471857162 |
| Tracking control information | Not next track upon no answer |
| Subscriber number | 3456789 |
| Subscriber's name | B |
| Incoming call destination priority | 1st priority |
| Terminal type | Mobile terminal 14 |
| Location registration information | Location registration area 40 |
| Incoming call address | 0305555555 |
| Tracking control information | Next track upon no answer |
| Incoming call destination priority | 2nd priority |
| Terminal type | Fixed terminal 13 |
| Location registration information | None |
| Incoming call address | 0471852222 |
| Tracking control information | Not next track upon no answer |

Table 3 given below shows, by way of example, the mobility information (before being updated) stored in the individual database 16 of the subscriber B. The individual database 16 manages mobility information similar to the mobility information stored in the individual database 15.

TABLE 3

| | |
|---|---|
| Subscriber number | 3456789 |
| Subscriber's name | B |
| Date and time | @@ (day), ## (month) 8:30–12:00 |
| Incoming call destination priority | 1st priority |
| Terminal type | Fixed terminal 13 |
| Location registration information | None |
| Incoming call address | 0471852222 |
| Tracking control information | Next track upon no answer |
| Incoming call destination priority | 2nd priority |
| Terminal type | Mobile terminal 14 |
| Location registration information | Location registration area 40 |
| Incoming call address | 0305555555 |
| Tracking control information | Next track upon no answer |
| Date and time | @@ (day) , ## (month) 12:00–8:30 |
| Incoming call destination priority | 1st priority |
| Terminal type | Mobile terminal 14 |
| Location registration information | Location registration area 40 |
| Incoming call address | 0305555555 |
| Tracking control information | Next track upon no answer |
| Incoming call destination priority | 2nd priority |
| Terminal type | Fixed terminal 13 |
| Location registration information | None |
| Incoming call address | 0471852222 |
| Tracking control information | Not next track upon no answer |
| Subscriber number | |
| Subscriber's name | |
| Incoming call destination | 1st priority |

TABLE 3-continued

| | |
|---|---|
| priority | |
| Terminal type | Fixed terminal 10 |
| Location registration information | |
| Incoming call address | |
| Tracking control information | Next track upon no answer |
| Incoming call destination priority | 2nd priority |
| Terminal type | Mobile terminal 12 |
| Location registration information | Location registration area 30 |
| Incoming call address | 0301111111 |
| Tracking control information | Next track upon no answer |
| Incoming call destination priority | 3rd priority |
| Terminal type | Fixed terminal 11 |
| Location registration information | None |
| Incoming call address | 0486681950 |
| Tracking control information | Not next track upon no answer |

The mobile switching offices 6, 7, 8 are connected to the fixed telephone network 1 and the Internet through the respective gateways 3, 4, 5. The mobile switching offices 6, 7, 8 are positioned respectively in location registration areas 20, 30, 40. The mobile terminal 12 is positioned in the location registration area 20, and the mobile terminal 14 is positioned in the location registration area 40.

Figure 4:
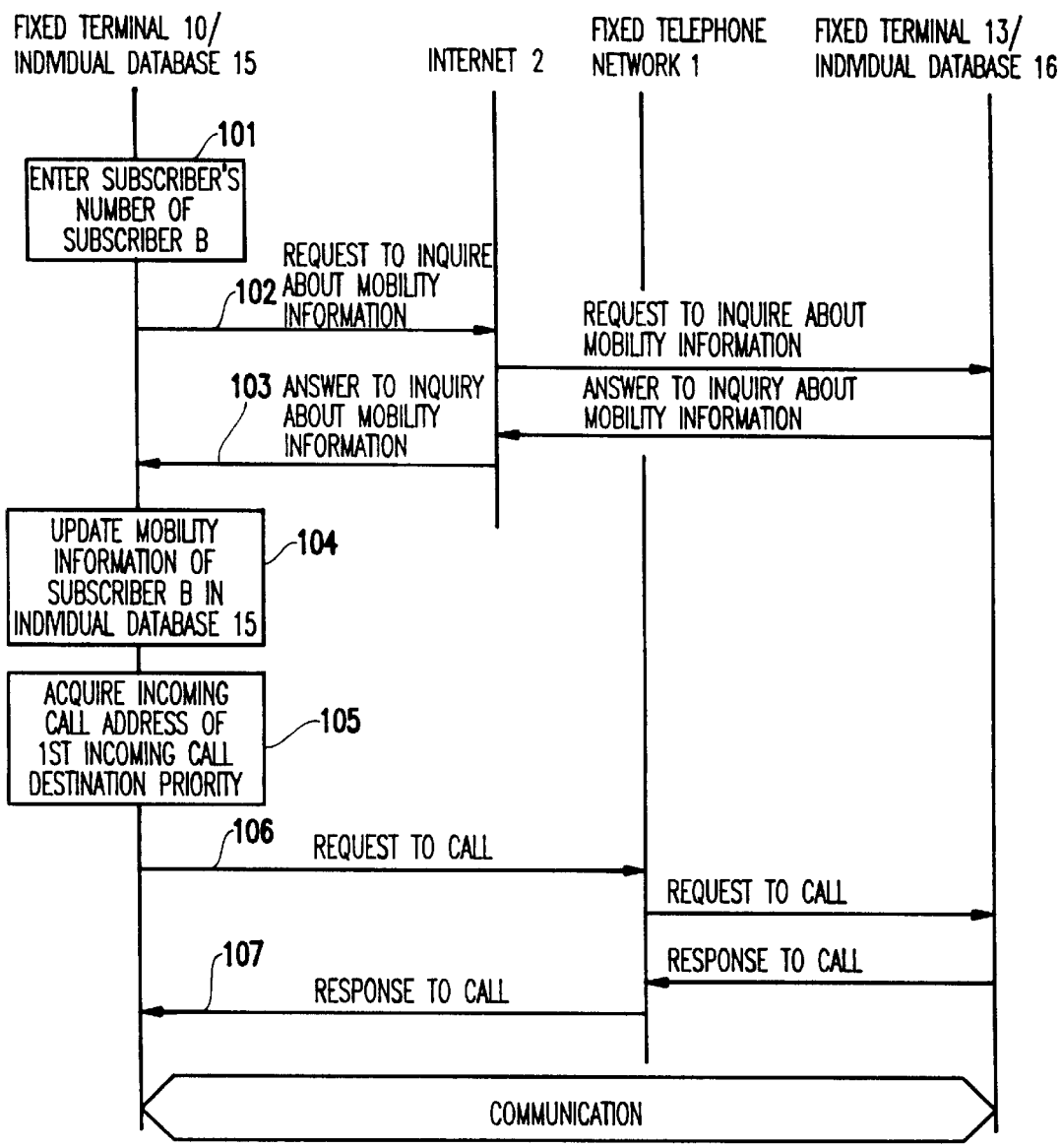
FIG. 4 is a sequence diagram of a first process of updating mobility information according to the present invention.

FIG. 4 shows a process of updating the mobility information.

For making a call from the subscriber A to the subscriber B registered in the individual database 15 at 9:00 AM in ## (date), @@ (month), the subscriber number "3456789" of the subscriber B is entered from the fixed terminal 10 of the subscriber A in a step 101. Based on the entered subscriber number "3456789", an inquiry about mobility information of the subscriber B in the individual database 16 is made via the Internet 2 in a step 102, and mobility information shown in Table 4 given below is obtained in a step 103. The mobility information of the subscriber B in the individual database 15 is updated with the obtained mobility information as shown in Table 5 in a step 104.

TABLE 4

| | |
|---|---|
| Subscriber number | 3456789 |
| Subscriber's name | B |
| Incoming call destination priority | 1st priority |
| Terminal type | Fixed terminal 13 |
| Location registration information | None |
| Incoming call address | 0471852222 |
| Tracking control information | Next track upon no answer |
| Incoming call destination priority | 2nd priority |
| Terminal type | Mobile terminal 14 |
| Location registration information | Location registration area 40 |
| Incoming call address | 0305555555 |
| Tracking control information | Not next track upon no answer |

TABLE 5

| | |
|---|---|
| Subscriber number | 1234567 |
| Subscriber's name | A |
| Date and time | @@ (day), ## (month) 8:30–17:15 |
| Incoming call destination priority | 1st priority |
| Terminal type | Fixed terminal 10 |
| Location registration information | None |
| Incoming call address | 0471857162 |
| Tracking control information | Next track upon no answer |
| Incoming call destination priority | 2nd priority |
| Terminal type | Mobile terminal 12 |
| Location registration information | Location registration area 20 |
| Incoming call address | 0301111111i |
| Tracking control information | Next track upon no answer |
| Incoming call destination priority | 3rd priority |
| Terminal type | Fixed terminal 11 |
| Location registration information | None |
| Incoming call address | 0486681950 |
| Tracking control information | Not next track upon no answer |
| Date and time | @@ (day), ## (month) 17:15–8:30 |
| Incoming call destination priority | 1st priority |
| Terminal type | Fixed terminal 11 |
| Location registration information | None |
| Incoming call address | 0486681590 |
| Tracking control information | Next track upon no answer |
| Incoming call destination priority | 2nd priority |
| Terminal type | Mobile terminal 12 |
| Location registration information | Location registration area 20 |
| Incoming call address | 0301111111 |
| Tracking control information | Next track upon no answer |
| Incoming call destination priority | 3rd priority |
| Terminal type | Fixed terminal 10 |
| Location registration information | None |
| Incoming call address | 0471857162 |
| Tracking control information | Not next track upon no answer |
| Subscriber number | 3456789 |
| Subscriber's name | B |
| Incoming call destination priority | 1st priority |
| Terminal type | Fixed terminal 13 |
| Location registration information | None |
| Incoming call address | 0471852222 |
| Tracking control information | Next track upon no answer |
| Incoming call destination priority | 2nd priority |
| Terminal type | Mobile terminal 14 |
| Location registration information | Location registration area 14 |
| Incoming call address | 0305555555 |
| Tracking control information | Not next track upon no answer |

From the mobility information, updated in the step 104, of the subscriber B stored in the individual database 15 of the subscriber A, the incoming call priority is checked, and the incoming address "047185222" of the fixed terminal 13 which is the first priority is acquired in a step 105. The subscriber B is called via the fixed terminal 13 in a step 106, and after an answer from the fixed terminal 13 is received in a step 107, communications with the subscriber B are started.

Figure 5:
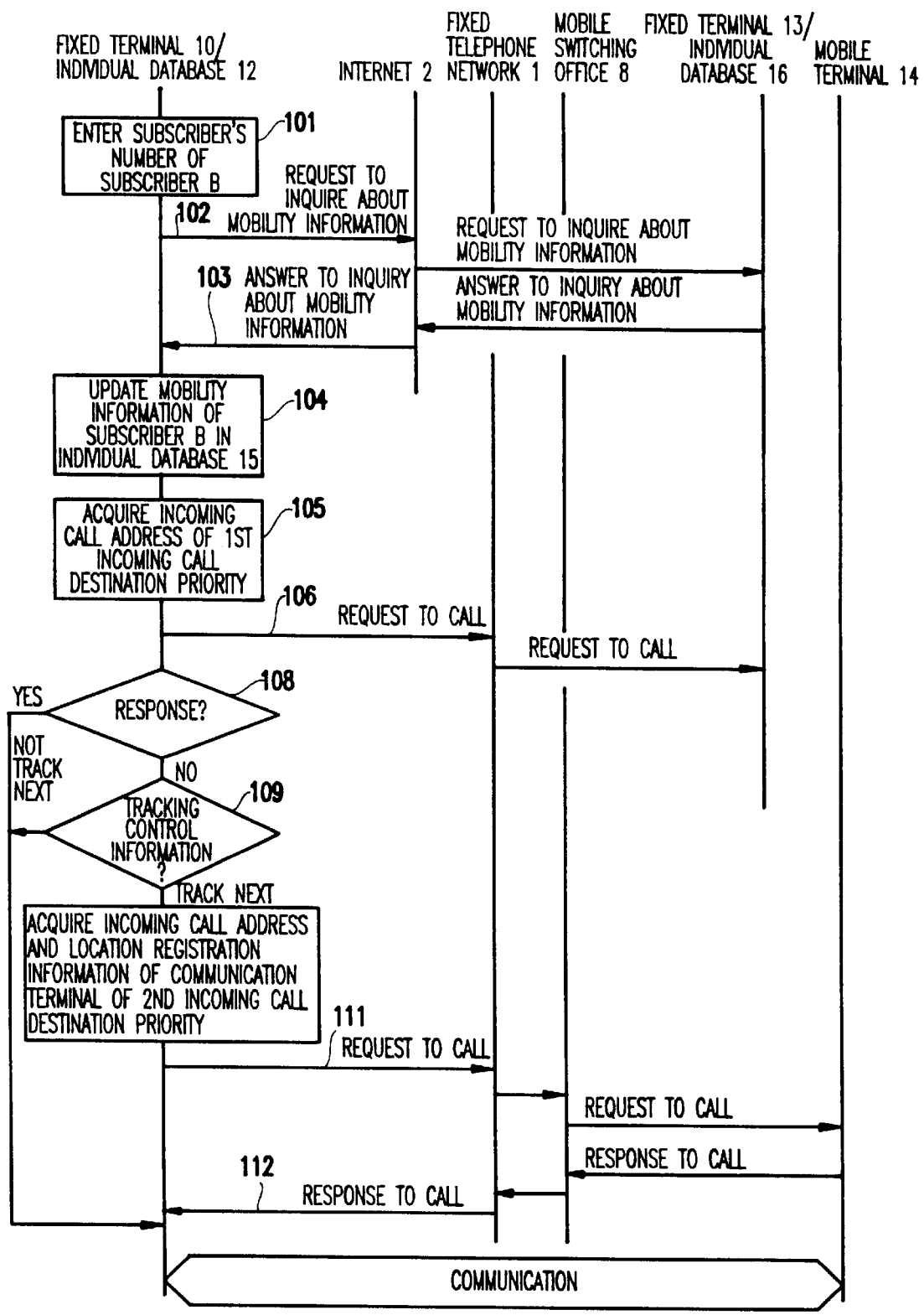
FIG. 5 is a sequence diagram of a second process of updating mobility information according to the present invention.

An updating process in case no answer is received from the fixed terminal 13 will be described below with reference to FIG. 5. The steps up to a call request from the subscriber A are the same as those shown in FIG. 4. The fixed terminal 10 of the subscriber A checks if there is an answer from the fixed terminal 13 of the subscriber B or not in a step 108. If "NO" in the step 108, then tracking control information of the fixed terminal 13 among the mobility information of the subscriber B stored in the individual database 15 is checked in a step 109. If "next track" in the step 109, then the incoming call address "0305555555" of the mobile terminal 14 which is the second priority in terms of the incoming call destination priority and the location registration information (location registration area 40) thereof are acquired in a step 110. The subscriber B is called via the mobile terminal 14 in a step 111, and after an answer from the mobile terminal 14 is received in a step 112, communications with the subscriber B are started.

Table 6 given below shows, by way of example, the mobility information (before being updated) stored in the individual database 15 of the subscriber A, and Table 7 given below shows, by way of example, the mobility information in the individual database 16 of the subscriber B.

TABLE 6

| | |
|---|---|
| Subscriber number | 1234567 |
| Subscriber's name | A |
| Date and time | @@ (day), ## (month) 8:30–17:15 |
| Incoming call destination priority | 1st priority |
| Terminal type | Fixed terminal 10 |
| Location registration information | None |
| Incoming call address | 0471857162 |
| Tracking control information | Next track upon no answer |
| Incoming call destination priority | 2nd priority |
| Terminal type | Mobile terminal 12 |
| Location registration information | Location registration area 20 |
| Incoming call address | 0301111111 |
| Tracking control information | Next track upon no answer |
| Incoming call destination priority | 3rd priority |
| Terminal type | Fixed terminal 11 |
| Location registration information | None |
| Incoming call address | 0486681950 |
| Tracking control information | Not next track upon no answer |
| Date and time | @@ (day), ## (month) 17:15–8:30 |
| Incoming call destination priority | 1st priority |
| Terminal type | Fixed terminal 11 |
| Incoming call address | 0486681950 |
| Location registration information | None |
| Tracking control information | Next track upon no answer |
| Incoming call destination priority | 2nd priority |
| Terminal type | Mobile terminal 12 |
| Location registration information | Location registration area 20 |
| Incoming call address | 0301111111 |

TABLE 6-continued

| | |
|---|---|
| Tracking control information | Next track upon no answer |
| Incoming call destination priority | 3rd priority |
| Terminal type | Fixed terminal 10 |
| Location registration information | None |
| Incoming call address | 0471857162 |
| Tracking control information | Not next track upon no answer |
| Subscriber number | 3456789 |
| Subscriber's name | B |
| Incoming call destination priority | 1st priority |
| Terminal type | Mobile terminal 14 |
| Location registration information | Location registration area 40 |
| Incoming call address | 0305555555 |
| Tracking control information | Next track upon no answer |
| Incoming call destination priority | 2nd priority |
| Terminal type | Fixed terminal 13 |
| Location registration information | None |
| Incoming call address | 0471852222 |
| Tracking control information | Not next track upon no answer |

TABLE 7

| | |
|---|---|
| Subscriber number | 3456789 |
| Subscriber's name | B |
| Date and time | @@ (day), ## (month) 8:30–12:00 |
| Incoming call destination priority | 1st priority |
| Terminal type | Fixed terminal 13 |
| Location registration information | None |
| Incoming call address | 0471852222 |
| Tracking control information | Next track upon no answer |
| Incoming call destination priority | 2nd priority |
| Terminal type | Mobile terminal 14 |
| Location registration information | Location registration area 40 |
| Incoming call address | 0305555555 |
| Tracking control information | Next track upon no answer |
| Date and time | @@ (day) , ## (month) 12:00–8:30 |
| Incoming call destination priority | 1st priority |
| Terminal type | Mobile terminal 14 |
| Location registration information | Location registration area 40 |
| Incoming call address | 0305555555 |
| Tracking control information | Next track upon no answer |
| Incoming call destination priority | 2nd priority |
| Terminal type | Fixed terminal 13 |
| Location registration information | None |
| Incoming call address | 0471852222 |
| Tracking control information | Not next track upon no answer |
| Subscriber number | 1234567 |
| Subscriber's name | A |
| Incoming call destination priority | 1st priority |
| Terminal type | Fixed terminal 10 |
| Location registration information | None |

TABLE 7-continued

| | |
|---|---|
| Incoming call address | 0471857162 |
| Tracking control information | Next track upon no answer |
| Incoming call destination priority | 2nd priority |
| Terminal type | Mobile terminal 12 |
| Location registration information | Location registration area 20 |
| Incoming call address | 0301111111 |
| Tracking control information | Next track upon no answer |
| Incoming call destination priority | 3rd priority |
| Terminal type | Fixed terminal 11 |
| Location registration information | None |
| Incoming call address | 0486681950 |
| Tracking control information | Not next track upon no answer |

Figure 6:
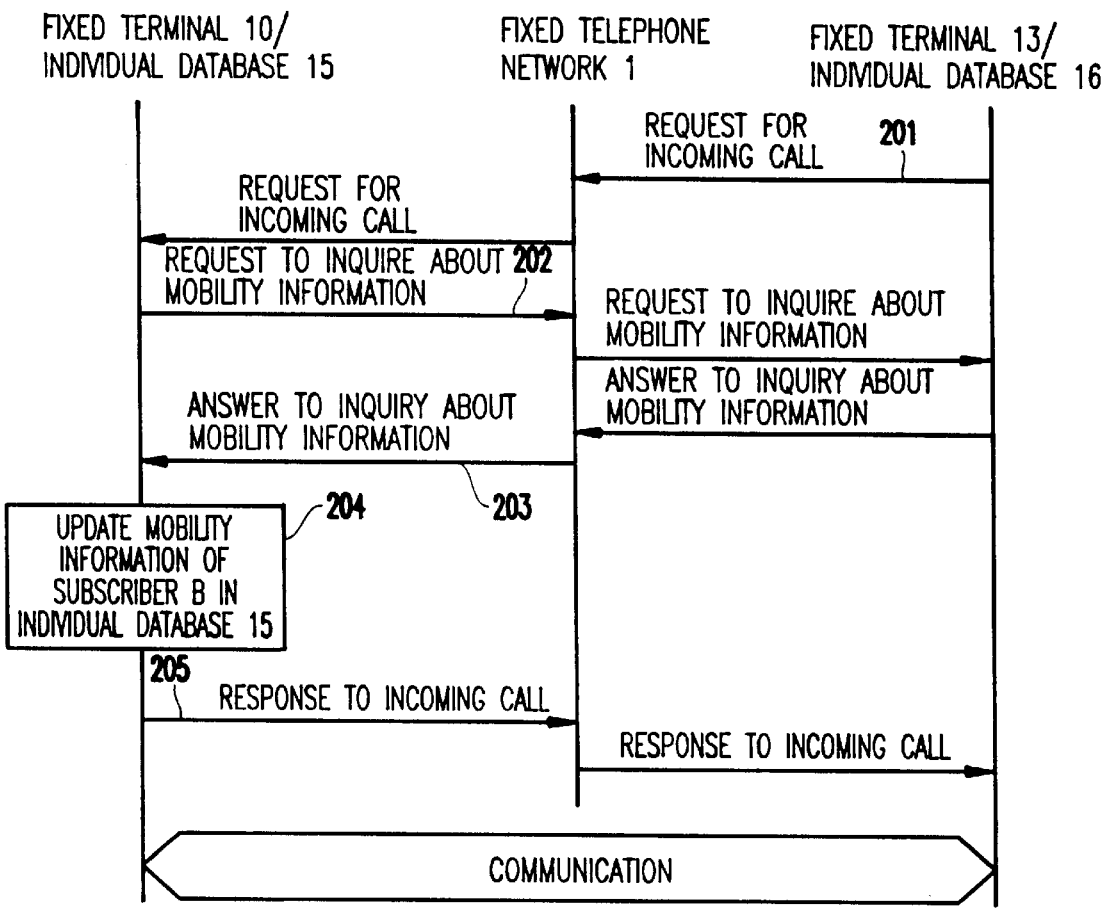
FIG. 6 is a sequence diagram of a third process of updating mobility information according to the present invention.

FIG. 6 shows another process of updating the mobility information.

When the subscriber A with the mobility information in Table 6 stored in the individual database 15 thereof receives an incoming call from the subscriber B at 11:00 AM in ## (date), @@ (month) in a step 201, the fixed terminal 10 of the subscriber A sends an inquiry about the subscriber B via the fixed telephone network 1 to the individual database 16 of the subscriber B in a step 202, and acquires mobility information shown in Table 8 in a step 203. The mobility information of the subscriber B in the individual database 15 is updated with mobility information shown in Table 9 in a step 204. The fixed terminal 10 transmits an response to the incoming call to the subscriber B in a step 205, and starts communications with the subscriber B.

TABLE 8

| | |
|---|---|
| Subscriber number | 3456789 |
| Subscriber's name | B |
| Incoming call destination priority | 1st priority |
| Terminal type | Fixed terminal 13 |
| Location registration information | None |
| Incoming call address | 0471852222 |
| Tracking control information | Next track upon no answer |
| Incoming call destination priority | 2nd priority |
| Terminal type | Mobile terminal 14 |
| Location registration information | Location registration area 40 |
| Incoming call address | 0305555555 |
| Tracking control information | Not next track no answer |

TABLE 9

| | |
|---|---|
| Subscriber number | 1234567 |
| Subscriber's name | A |
| Date and time | @@ (day), ## (month) 8:30–17:15 |
| Incoming call destination priority | 1st priority |
| Terminal type | Fixed terminal 10 |
| Location registration information | None |
| Incoming call address | 0471857162 |
| Tracking control information | Next track upon no answer |

TABLE 9-continued

| | |
|---|---|
| Incoming call destination priority | 2nd priority |
| Terminal type | Mobile terminal 12 |
| Location registration information | Location registration area 20 |
| Incoming call address | 0301111111 |
| Tracking control information | Next track upon no answer |
| Incoming call destination priority | 3rd priority |
| Terminal type | Fixed terminal 11 |
| Location registration information | None |
| Incoming call address | 0486681950 |
| Tracking control information | Not next track upon no answer |
| Date and time | @@ (day), ## (month) 17:15–8:30 |
| Incoming call destination priority | 1st priority |
| Terminal type | Fixed terminal 11 |
| Location registration information | None |
| Incoming call address | 0486681950 |
| Tracking control information | Next track upon no answer |
| Incoming call destination priority | 2nd priority |
| Terminal type | Mobile terminal 12 |
| Location registration information | Location registration area 20 |
| Incoming call address | 0301111111 |
| Tracking control information | Next track upon no answer |
| Incoming call destination priority | 3rd priority |
| Terminal type | Fixed terminal 10 |
| Location registration information | None |
| Incoming call address | 0471857162 |
| Tracking control information | Not next track upon no answer |
| Subscriber number | 3456789 |
| Subscriber's name | B |
| Incoming call destination priority | 1st priority |
| Terminal type | Fixed terminal 13 |
| Location registration information | None |
| Incoming call address | 0471852222 |
| Tracking control information | Next track upon no answer |
| Incoming call destination priority | 2nd priority |
| Terminal type | Mobile terminal 14 |
| Location registration information | Location registration area 40 |
| Incoming call address | 0305555555 |
| Tracking control information | Not next track upon no answer |

Table 10 given below shows, by way of example, the mobility information (before being updated) stored in the individual database 15 of the subscriber A, and Table 11 given below shows, by way of example, the mobility information (before being updated) in the individual database 16 of the subscriber B.

TABLE 10

| | |
|---|---|
| Subscriber number | 1234567 |
| Subscriber's name | A |
| Date and time | @@ (day), ## (month) 8:30–17:15 |
| Incoming call destination priority | 1st priority |

TABLE 10-continued

| | |
|---|---|
| Terminal type | Mobile terminal 12 |
| Location registration information | Location registration area 20 |
| Incoming call address | 0301111111 |
| Tracking control information | Next track upon no answer |
| Incoming call destination priority | 2nd priority |
| Terminal type | Fixed terminal 10 |
| Location registration information | None |
| Incoming call address | 0471857162 |
| Tracking control information | Next track upon no answer |
| Incoming call destination priority | 3rd priority |
| Terminal type | Fixed terminal 11 |
| Location registration information | None |
| Incoming call address | 0486681950 |
| Tracking control information | Not next track upon no answer |
| Date and time | @@ (day), ## (month) 17:15–8:30 |
| Incoming call destination priority | 1st priority |
| Terminal type | Fixed terminal 11 |
| Location registration information | None |
| Incoming call address | 0486681950 |
| Tracking control information | Next track upon no answer |
| Incoming call destination priority | 2nd priority |
| Terminal type | Mobile terminal 12 |
| Location registration information | Location registration area 20 |
| Incoming call address | 0301111111 |
| Tracking control information | Next track upon no answer |
| Incoming call destination priority | 3rd priority |
| Terminal type | Fixed terminal 10 |
| Location registration information | None |
| Incoming call address | 0471857162 |
| Tracking control information | Not next track upon no answer |
| Subscriber number | 3456789 |
| Subscriber's name | B |
| Incoming call destination priority | 1st priority |
| Terminal type | Mobile terminal 14 |
| Location registration information | Location registration area 40 |
| Incoming call address | 0305555555 |
| Tracking control information | Next track upon no answer |
| Incoming call destination priority | 2nd priority |
| Terminal type | Fixed terminal 13 |
| Location registration information | None |
| Incoming call address | 0471852222 |
| Tracking control information | Not next track upon no answer |

TABLE 11

| | |
|---|---|
| Subscriber number | 3456789 |
| Subscriber's name | B |
| Date and time | @@ (day), ## (month) 8:30–12:00 |
| Incoming call destination priority | 1st priority |
| Terminal type | Fixed terminal 13 |

TABLE 11-continued

| | |
|---|---|
| Location registration information | None |
| Incoming call address | 0471852222 |
| Tracking control information | Next track upon no answer |
| Incoming call destination priority | 2nd priority |
| Terminal type | Mobile terminal 14 |
| Location registration information | Location registration area 40 |
| Incoming call address | 0305555555 |
| Tracking control information | Not next track upon no answer |
| Date and time | @@ (day), ## (month) 12:00–8:30 |
| Incoming call destination priority | 1st priority |
| Terminal type | Mobile terminal 14 |
| Location registration information | Location registration area 40 |
| Incoming call address | 0305555555 |
| Tracking control information | Next track upon no answer |
| Incoming call destination priority | 2nd priority |
| Terminal type | Fixed terminal 13 |
| Location registration information | None |
| Incoming call address | 0471852222 |
| Tracking control information | Not next track upon no answer |
| Subscriber number | 1234567 |
| Subscriber's name | A |
| Incoming call destination priority | 1st priority |
| Terminal type | Mobile terminal 12 |
| Location registration information | Location registration area 20 |
| Incoming call address | 0301111111 |
| Tracking control information | Next track upon no answer |
| Incoming call destination priority | 2nd priority |
| Terminal type | Fixed terminal 12 |
| Location registration information | None |
| Incoming call address | 0471857162 |
| Tracking control information | Next track upon no answer |
| Incoming call destination priority | 3rd priority |
| Terminal type | Fixed terminal 11 |
| Location registration information | None |
| Incoming call address | 0486681950 |
| Tracking control information | Not next track upon no answer |

Figure 7:
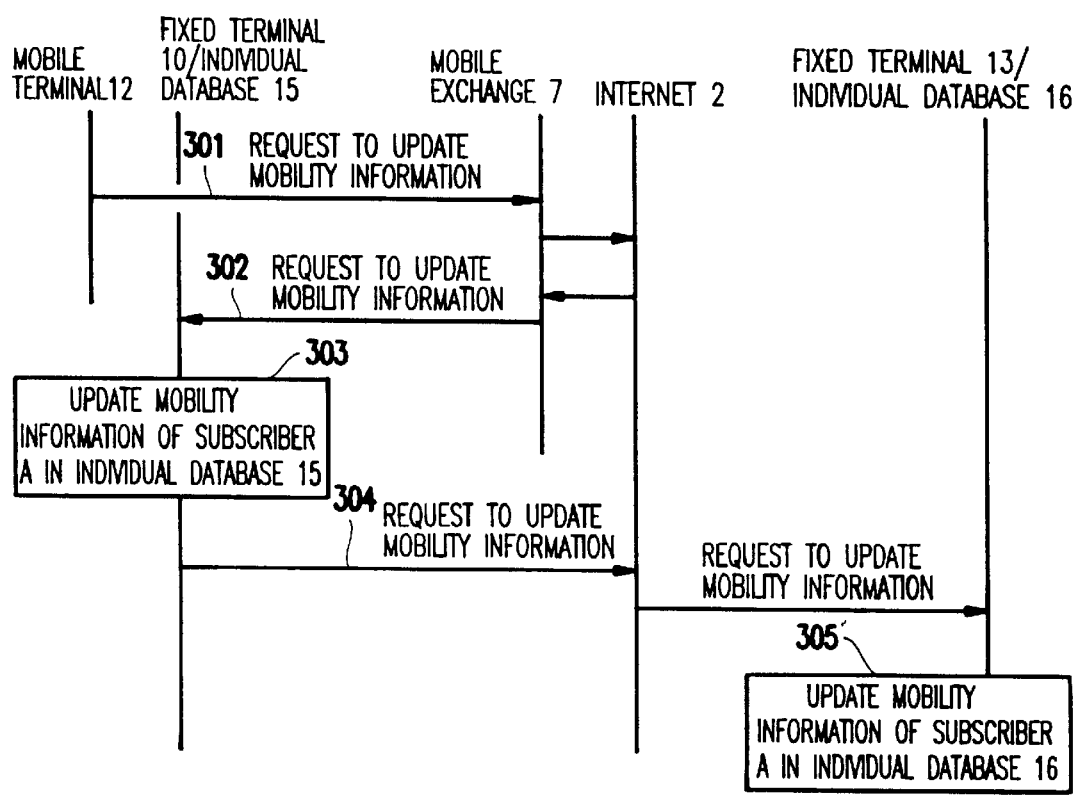
FIG. 7 is a sequence diagram of a fourth process of updating mobility information according to the present invention.

FIG. 7 shows still another process of updating the mobility information.

The location registration information of the mobile terminal 12 in the mobility information, shown in Table 10, in the individual database 15 of the subscriber A at 11:00 AM in ## (date), @@ (month) represents the location registration area 20. If the mobile terminal 12 moves from the location registration area 20 into the location registration area 30 upon movement of the subscriber A, then the mobile terminal 12 transmits a request to update the mobility information as shown in Table 12 to the fixed terminal 10 in a step 301. In response to the request to update the mobility information in a step 302, the fixed terminal 10 updates the mobility information of the subscriber A in the individual database 15 thereof in a step 303. Table 13 shows updated mobility information in the individual database 15 of the subscriber A. Then, the fixed terminal 10 sends the request to update the mobility information as shown in Table 12 simultaneously to the other subscriber B and subscribers C, D, . . . (omitted from Table 13) that are registered in the individual database 15 in a step 304. In response to the request to update the mobility information, the fixed terminal 13 of the subscriber B updates the mobility information of the subscriber A in the individual database 16 of the subscriber B in a step 305. Table 14 shows updated mobility information in the individual database 16 of the subscriber B.

TABLE 12

| | |
|---|---|
| Subscriber number | 1234567 |
| Subscriber's name | A |
| Incoming call destination priority | 1st priority |
| Terminal type | Mobile terminal 12 |
| Location registration information | Location registration area 30 |
| Incoming call address | 0301111111 |
| Tracking control information | Next track upon no answer |
| Incoming call destination priority | 2nd priority |
| Terminal type | Fixed terminal 10 |
| Location registration information | None |
| Incoming call address | 0471857162 |
| Tracking control information | Next track upon no answer |
| Incoming call destination priority | 3rd priority |
| Terminal type | Fixed terminal 11 |
| Location registration information | None |
| Incoming call address | 0486681950 |
| Tracking control information | Not next track upon no answer |

TABLE 13

| | |
|---|---|
| Subscriber number | 1234567 |
| Subscriber's name | A |
| Date and time | @@ (day), ## (month) 8:30–17:15 |
| Incoming call destination priority | 1st priority |
| Terminal type | Mobile terminal 12 |
| Location registration information | Location registration area 30 |
| Incoming call address | 0301111111 |
| Tracking control information | Next track upon no answer |
| Incoming call destination priority | 2nd priority |
| Terminal type | Fixed terminal 10 |
| Location registration information | None |
| Incoming call address | 0471857162 |
| Tracking control information | Next track upon no answer |
| Incoming call destination priority | 3rd priority |
| Terminal type | Fixed terminal 11 |
| Location registration information | None |
| Incoming call address | 0486681950 |
| Tracking control information | Not next track upon no answer |
| Date and time | @@ (day), ## (month) 17:15–8:30 |
| Incoming call destination priority | 1st priority |
| Terminal type | Fixed terminal 11 |
| Location registration information | None |

TABLE 13-continued

| | |
|---|---|
| Incoming call address | 0486681950 |
| Tracking control information | Next track upon no answer |
| Incoming call destination priority | 2nd priority |
| Terminal type | Mobile terminal 12 |
| Location registration information | Location registration area 30 |
| Incoming call address | 0301111111 |
| Tracking control information | Next track upon no answer |
| Incoming call destination priority | 3rd priority |
| Terminal type | Fixed terminal 10 |
| Location registration information | None |
| Incoming call address | 0471857162 |
| Tracking control information | Not next track upon no answer |
| Subscriber number | 3456789 |
| Subscriber's name | B |
| Incoming call destination priority | 1st priority |
| Terminal type | Mobile terminal 14 |
| Location registration information | Location registration area 40 |
| Incoming call address | 0305555555 |
| Tracking control information | Next track upon no answer |
| Incoming call destination priority | 2nd priority |
| Terminal type | Fixed terminal 13 |
| Location registration information | None |
| Incoming call address | 0471852222 |
| Tracking control information | Not next track upon no answer |

TABLE 14

| | |
|---|---|
| Subscriber number | 3456789 |
| Subscriber's name | B |
| Date and time | @@ (day), ## (month) 8:30–12:00 |
| Incoming call destination priority | 1st priority |
| Terminal type | Fixed terminal 13 |
| Location registration information | None |
| Incoming call address | 0471852222 |
| Tracking control information | Next track upon no answer |
| Incoming call destination priority | 2nd priority |
| Terminal type | Mobile terminal 14 |
| Location registration information | Location registration area 40 |
| Incoming call address | 0305555555 |
| Tracking control information | Not next track upon no answer |
| Date and time | @@ (day), ## (month) 12:00–8:30 |
| Incoming call destination priority | 1st priority |
| Terminal type | Mobile terminal 14 |
| Location registration information | Location registration area 40 |
| Incoming call address | 0305555555 |
| Tracking control information | Next track upon no answer |
| Incoming call destination priority | 2nd priority |
| Terminal type | Fixed terminal 13 |
| Location registration information | None |
| Incoming call address | 0471852222 |

TABLE 14-continued

| | |
|---|---|
| Tracking control information | Not next track upon no answer |
| Subscriber number | 1234567 |
| Subscriber's name | A |
| Incoming call destination priority | 1st priority |
| Terminal type | Mobile terminal 12 |
| Location registration information | Location registration area 30 |
| Incoming call address | 0301111111 |
| Tracking control information | Next track upon no answer |
| Incoming call destination priority | 2nd priority |
| Terminal type | Fixed terminal 10 |
| Location registration information | None |
| Incoming call address | 0471857162 |
| Tracking control information | Next track upon no answer |
| Incoming call destination priority | 3rd priority |
| Terminal type | Fixed terminal 11 |
| Location registration information | None |
| Incoming call address | 0486681950 |
| Tracking control information | Not next track upon no answer |

Table 15 given below shows, by way of example, the mobility information (before being updated) stored in the individual database 15 of the subscriber A, and Table 16 given below shows, by way of example, the mobility information (before being updated) in the individual database 16 of the subscriber B.

TABLE 15

| | |
|---|---|
| Subscriber number | 1234567 |
| Subscriber's name | A |
| Date and time | @@ (day), ## (month) 8:30–17:15 |
| Incoming call destination priority | 1st priority |
| Terminal type | Fixed terminal 10 |
| Location registration information | None |
| Incoming call address | 0471857162 |
| Tracking control information | Next track upon no answer |
| Incoming call destination priority | 2nd priority |
| Terminal type | Mobile terminal 12 |
| Location registration information | Location registration area 20 |
| Incoming call address | 0301111111 |
| Tracking control information | Next track upon no answer |
| Incoming call destination priority | 3rd priority |
| Terminal type | Fixed terminal 11 |
| Location registration information | None |
| Incoming call address | 0486681950 |
| Tracking control information | Not next track upon no answer |
| Date and time | @@ (day), ## (month) 17:15–8:30 |
| Incoming call destination priority | 1st priority |
| Terminal type | Fixed terminal 11 |
| Location registration information | None |
| Incoming call address | 0486681950 |
| Tracking control information | Next track upon no answer |

TABLE 15-continued

| | |
|---|---|
| Incoming call destination priority | 2nd priority |
| Terminal type | Mobile terminal 12 |
| Location registration information | Location registration area 20 |
| Incoming call address | 0301111111 |
| Tracking control information | Next track upon no answer |
| Incoming call destination priority | 3rd priority |
| Terminal type | Fixed terminal 10 |
| Location registration information | None |
| Incoming call address | 0471857162 |
| Tracking control information | Not next track upon no answer |
| Subscriber number | 3456789 |
| Subscriber's name | B |
| Incoming call destination priority | 1st priority |
| Terminal type | Mobile terminal 14 |
| Location registration information | Location registration area 40 |
| Incoming call address | 0305555555 |
| Tracking control information | Next track upon no answer |
| Incoming call destination priority | 2nd priority |
| Terminal type | Fixed terminal 13 |
| Location registration information | None |
| Incoming call address | 0471852222 |
| Tracking control information | Not next track upon no answer |

TABLE 16

| | |
|---|---|
| Subscriber number | 3456789 |
| Subscriber's name | B |
| Date and time | @@ (day), ## (month) 8:30–12:00 |
| Incoming call destination priority | 1st priority |
| Terminal type | Fixed terminal 13 |
| Location registration information | None |
| Incoming call address | 0471852222 |
| Tracking control information | Next track upon no answer |
| Incoming call destination priority | 2nd priority |
| Terminal type | Mobile terminal 14 |
| Location registration information | Location registration area 40 |
| Incoming call address | 0305555555 |
| Tracking control information | Not next track upon no answer |
| Date and time | @@ (day), ## (month) 12:00–8:30 |
| Incoming call destination priority | 1st priority |
| Terminal type | Mobile terminal 14 |
| Location registration information | Location registration area 40 |
| Incoming call address | 0305555555 |
| Tracking control information | Next track upon no answer |
| Incoming call destination priority | 2nd priority |
| Terminal type | Fixed terminal 13 |
| Location registration information | None |
| Incoming call address | 0471852222 |
| Tracking control information | Not next track upon no answer |
| Subscriber number | 1234567 |
| Subscriber's name | A |
| Incoming call destination priority | 1st priority |
| Terminal type | Fixed terminal 10 |
| Location registration information | None |
| Incoming call address | 0471857162 |
| Tracking control information | Next track upon no answer |
| Incoming call destination priority | 2nd priority |
| Terminal type | Mobile terminal 12 |
| Location registration information | Location registration area 20 |
| Incoming call address | 0301111111 |
| Tracking control information | Next track upon no answer |
| Incoming call destination priority | 3rd priority |
| Terminal type | Fixed terminal 11 |
| Location registration information | None |
| Incoming call address | 0486681950 |
| Tracking control information | Not next track upon no answer |

Figure 8:
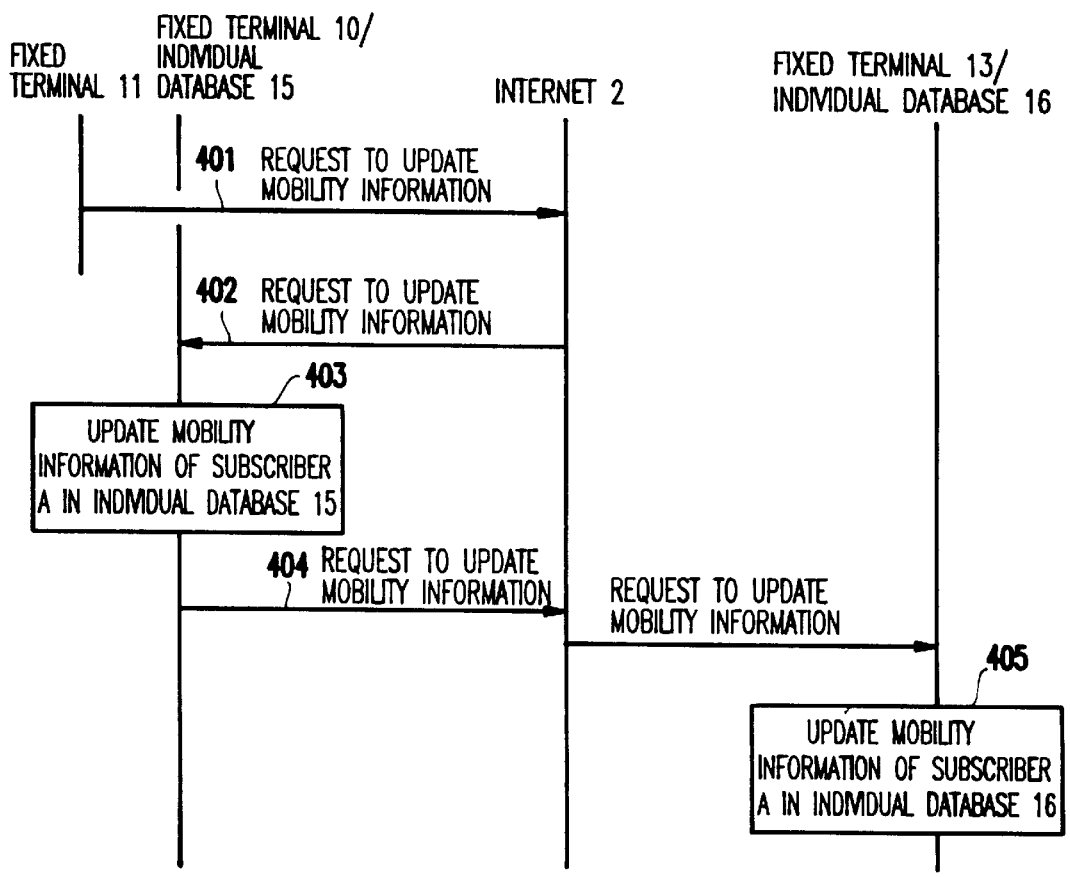
FIG. 8 is a sequence diagram of a fifth process of updating mobility information according to the present invention.

FIG. 8 shows yet still another process of updating the mobility information.

When a portable subscriber information memory card which carries the same information as the mobility information, shown in Table 15, in the individual database 15 of the subscriber A is inserted in the fixed terminal 11 at 11:00 AM in ## (date), @@ (month), the fixed terminal 11 transmits a request to update the mobility information as shown in Table 17 to the fixed terminal 10 in a step 401. In response to the request to update the mobility information in a step 402, the fixed terminal 10 updates the mobility information of the subscriber A in the individual database 15 thereof in a step 403. Table 18 shows updated mobility information in the individual database 15 of the subscriber A. Then, the fixed terminal 10 sends the request to update the mobility information as shown in Table 17 simultaneously to the other subscriber B and subscribers C, D, . . . (omitted from Table 18) that are registered in the individual database 15 in a step 404. In response to the request to update the mobility information, the fixed terminal 13 of the subscriber B updates the mobility information of the subscriber A in the individual database 16 of the subscriber B in a step 405. Table 19 shows updated mobility information in the individual database 16 of the subscriber B.

TABLE 17

| | |
|---|---|
| Subscriber number | 1234567 |
| Subscriber's name | A |
| Incoming call destination priority | 1st priority |
| Terminal type | Fixed terminal 11 |
| Location registration information | None |
| Incoming call address | 0486681950 |
| Tracking control information | Next track upon no answer |
| Incoming call destination priority | 2nd priority |
| Terminal type | Fixed terminal 10 |
| Location registration information | None |
| Incoming call address | 0471857162 |
| Tracking control information | Next track upon no answer |

TABLE 17-continued

| | |
|---|---|
| Incoming call destination priority | 3rd priority |
| Terminal type | Mobile terminal 12 |
| Location registration information | Location registration area 30 |
| Incoming call address | 0301111111 |
| Tracking control information | Not next track upon no answer |

TABLE 18

| | |
|---|---|
| Subscriber number | 1234567 |
| Subscriber's name | A |
| Date and time | @@ (day), ## (month) 8:30–17:15 |
| Incoming call destination priority | 1st priority |
| Terminal type | Fixed terminal 11 |
| Location registration information | None |
| Incoming call address | 0486681950 |
| Tracking control information | Next track upon no answer |
| Incoming call destination priority | 2nd priority |
| Terminal type | Fixed terminal 10 |
| Location registration information | None |
| Incoming call address | 0471857162 |
| Tracking control information | Next track upon no answer |
| Incoming call destination priority | 3rd priority |
| Terminal type | Mobile terminal 12 |
| Location registration information | Location registration area 30 |
| Incoming call address | 0301111111 |
| Tracking control information | Not next track upon no answer |
| Date and time | @@ (day), ## (month) 17:15–8:30 |
| Incoming call destination priority | 1st priority |
| Terminal type | Fixed terminal 11 |
| Location registration information | None |
| Incoming call address | 0486681950 |
| Tracking control information | Next track upon no answer |
| Incoming call destination priority | 2nd priority |
| Terminal type | Mobile terminal 12 |
| Location registration information | Location registration area 30 |
| Incoming call address | 0301111111 |
| Tracking control information | Next track upon no answer |
| Incoming call destination priority | 3rd priority |
| Terminal type | Fixed terminal 10 |
| Location registration information | None |
| Incoming call address | 0471857162 |
| Tracking control information | Not next track upon no answer |
| Subscriber number | 3456789 |
| Subscriber's name | B |
| Incoming call destination priority | 1st priority |
| Terminal type | Mobile terminal 14 |
| Location registration information | Location registration area 40 |
| Incoming call address | 0305555555 |
| Tracking control information | Next track upon no answer |
| Incoming call destination priority | 2nd priority |

TABLE 18-continued

| | |
|---|---|
| priority | |
| Terminal type | Fixed terminal 13 |
| Location registration information | None |
| Incoming call address | 0471852222 |
| Tracking control information | Not next track upon no answer |

TABLE 19

| | |
|---|---|
| Subscriber number | 3456789 |
| Subscriber's name | B |
| Date and time | @@ (day), ## (month) 8:30–12:00 |
| Incoming call destination priority | 1st priority |
| Terminal type | Fixed terminal 13 |
| Location registration information | None |
| Incoming call address | 0471852222 |
| Tracking control information | Next track upon no answer |
| Incoming call destination priority | 2nd priority |
| Terminal type | Mobile terminal 14 |
| Location registration information | Location registration area 40 |
| Incoming call address | 0305555555 |
| Tracking control information | Not next track upon no answer |
| Date and time | @@ (day), ## (month) 12:00–8:30 |
| Incoming call destination priority | 1st priority |
| Terminal type | Mobile terminal 14 |
| Location registration information | Location registration area 40 |
| Incoming call address | 0305555555 |
| Tracking control information | Next track upon no answer |
| Incoming call destination priority | 2nd priority |
| Terminal type | Fixed terminal 13 |
| Location registration information | None |
| Incoming call address | 0471852222 |
| Tracking control information | Not next track upon no answer |
| Subscriber number | 1234567 |
| Subscriber's name | A |
| Incoming call destination priority | 1st priority |
| Terminal type | Fixed terminal 11 |
| Location registration information | None |
| Incoming call address | 0486681950 |
| Tracking control information | Next track upon no answer |
| Incoming call destination priority | 2nd priority |
| Terminal type | Fixed terminal 10 |
| Location registration information | None |
| Incoming call address | 0471857162 |
| Tracking control information | Next track upon no answer |
| Incoming call destination priority | 3rd priority |
| Terminal type | Movable terminal 12 |
| Location registration information | Location registration area 30 |
| Incoming call address | 0301111111 |
| Tracking control information | Not next track upon no answer |

In the communication system shown in FIG. 3, only the fixed terminal 10 of the subscriber A and the fixed terminal of the subscriber B have respective individual databases. However, the fixed terminal 11 and the mobile terminal 12 may have respective individual databases identical to the individual database 15. Similarly, the mobile terminal 14 may have an individual database identical to the individual database 16.

While data communications are performed between the terminals via the Internet 2 in FIG. 3, such a configuration is illustrated by way of example only, and data communications may be performed between the terminals via ISDN subscriber circuits, analog circuits, or outgoing and incoming call communication circuits.

The mobility information may be updated manually by the subscribers.

While preferred embodiments of the present invention have been described using specific terms, such description is for illustrative purposes only, and it is to be understood that changes and variations may be made without departing from the spirit or scope of the following claims.

What is claimed is:

1. A communication terminal for use in a communication system for performing voice communications and data communications, comprising an individual database for managing mobility information including:
    (a) a subscriber number of a subscriber;
    (b) a type of a registered communication terminal owned by the subscriber;
    (c) incoming call destination priority information for determining a priority rank for the registered communication terminal to receive an incoming call;
    (d) present location registration information of the registered communication terminal if the registered communication terminal is a mobile terminal;
    (e) an incoming call address of the registered communication terminal;
    (f) tracking control information as to whether an incoming call is to be received by a communication terminal having a next priority rank if the registered communication terminal is incapable of communication;
    (g) the information (a)–(f) classified according to dates and times;
    (h) a subscriber number, registered by said subscriber, of at least one other subscriber; and
    (i) the information (a)–(f) of said at least one other subscriber.

2. A method of calling a subscriber in a communication system which performs voice communications and data communications using a communication terminal which comprises an individual database for managing mobility information including (a) a subscriber number of a subscriber, (b) a type of a registered communication terminal owned by the subscriber, (c) incoming call destination priority information for determining a priority rank for the registered communication terminal to receive an incoming call, (d) present location registration information of the registered communication terminal if the registered communication terminal is a mobile terminal, (e) an incoming call address of the registered communication terminal, (f) tracking control information as to whether an incoming call is to be received by a communication terminal having a next priority rank if the registered communication terminal is incapable of communication, (g) the information (a)–(f) classified according to dates and times, (h) a subscriber number, registered by said subscriber, of at least one other subscriber, and (i) the information (a)–(f) of said at least one other subscriber, said method comprising the steps of:
    entering the subscriber number of the other subscriber, to which a call is to be transmitted, from the communication terminal of said subscriber;
    inquiring about mobility information of the other subscriber, which is stored in an individual database of the other subscriber, based on the entered subscriber number via a communication network to acquire the mobility information of the other subscriber;
    updating mobility information of the other subscriber, which is stored in the individual database of the subscriber, based on the acquired mobility information of the other subscriber;
    checking incoming call destination priority information based on the updated mobility information of the other subscriber in the individual database of the subscriber, and acquiring an incoming call address of a communication terminal which has a first priority rank; and
    calling the other subscriber via the communication terminal which has the acquired incoming call address.

3. A method according to claim 2, further comprising the steps of:
    if the subscriber is incapable of communication with the communication terminal which has the acquired incoming call address, checking tracking control information of the communication terminal;
    if the tracking control information represents tracking control, acquiring an incoming call address of a communication terminal whose incoming call destination priority information represents a next priority rank; and
    calling the other subscriber via the communication terminal having the acquired incoming call address.

4. A method of updating mobility information in a communication system which performs voice communications and data communications using a communication terminal which comprises an individual database for managing mobility information including (a) a subscriber number of a subscriber, (b) a type of a registered communication terminal owned by the subscriber, (c) incoming call destination priority information for determining a priority rank for the registered communication terminal to receive an incoming call, (d) present location registration information of the registered communication terminal if the registered communication terminal is a mobile terminal, (e) an incoming call address of the registered communication terminal, (f) tracking control information as to whether an incoming call is to be received by a communication terminal having a next priority rank if the registered communication terminal is incapable of communication, (g) the information (a)–(f) classified according to dates and times, (h) a subscriber number, registered by said subscriber, of at least one other subscriber, and (i) the information (a)–(f) of said at least one other subscriber, said method comprising the steps of:
    when a mobile terminal owned by the subscriber is switched on or moves from a location registration area into another location registration area, sending a request to update mobility information from said mobile terminal to a mobile terminal having an individual database; and
    updating the mobility information of the subscriber which is stored in the individual database of the subscriber.

5. A method according to claim 4, further comprising the steps of:
    transmitting the request to update mobility information from the mobile terminal of the subscriber simultaneously to other subscribers registered in the individual database of the subscriber; and updating the mobility information of the subscriber in individual databases of mobile terminals of the other subscribers in response to the request to update mobility information.

6. A method of updating mobility information in a communication system which performs voice communications and data communications using a communication terminal which comprises an individual database for managing mobility information including (a) a subscriber number of a subscriber, (b) a type of a registered communication terminal owned by the subscriber, (c) incoming call destination priority information for determining a priority rank for the registered communication terminal to receive an incoming call, (d) present location registration information of the registered communication terminal if the registered communication terminal is a mobile terminal, (e) an incoming call address of the registered communication terminal, (f) tracking control information as to whether an incoming call is to be received by a communication terminal having a next priority rank if the registered communication terminal is incapable of communication, (g) the information (a)–(f) classified according to dates and times, (h) a subscriber number, registered by said subscriber, of at least one other subscriber, and (i) the information (a)–(f) of said at least one other subscriber, said method comprising the steps of:

when the subscriber inserts a portable subscriber information memory card which carries the same information as the mobility information in the individual database into the communication terminal, transmitting a request to update mobility information from said communication terminal to another communication terminal having an individual database; and updating the mobility information of the subscriber in the other individual database.

7. A method according to claim 6, further comprising the steps of:

transmitting the request to update mobility information from the mobile terminal of the subscriber simultaneously to other subscribers registered in the individual database of the subscriber; and updating the mobility information of the subscriber in individual databases of mobile terminals of the other subscribers in response to the request to update mobility information.

8. A method of updating mobility information in a communication system which performs voice communications and data communications using a communication terminal which comprises an individual database for managing mobility information including (a) a subscriber number of a subscriber, (b) a type of a registered communication terminal owned by the subscriber, (c) incoming call destination priority information for determining a priority rank for the registered communication terminal to receive an incoming call, (d) present location registration information of the registered communication terminal if the registered communication terminal is a mobile terminal, (e) an incoming call address of the registered communication terminal, (f) tracking control information as to whether an incoming call is to be received by a communication terminal having a next priority rank if the registered communication terminal is incapable of communication, (g) the information (a)–(f) classified according to dates and times, (h) a subscriber number, registered by said subscriber, of at least one other subscriber, and (i) the information (a)–(f) of said at least one other subscriber, said method comprising the step of:

when the subscriber changes communication terminals, accessing another communication terminal having an individual database via telephone to update the mobility information of the subscriber in the other individual database.

9. A method according to claim 8, further comprising the steps of:

when the subscriber receives an incoming call from the other subscriber registered in the individual database thereof, receiving mobility information of the other subscriber; and automatically updating the mobility information of the other subscriber stored in the individual database of the subscriber.

10. A method of updating mobility information in a communication system which performs voice communications and data communications using a communication terminal which comprises an individual database for managing mobility information including (a) a subscriber number of a subscriber, (b) a type of a registered communication terminal owned by the subscriber, (c) incoming call destination priority information for determining a priority rank for the registered communication terminal to receive an incoming call, (d) present location registration information of the registered communication terminal if the registered communication terminal is a mobile terminal, (e) an incoming call address of the registered communication terminal, (f) tracking control information as to whether an incoming call is to be received by a communication terminal having a next priority rank if the registered communication terminal is incapable of communication, (g) the information (a)–(f) classified according to dates and times, (h) a subscriber number, registered by said subscriber, of at least one other subscriber, and (i) the information (a)–(f) of said at least one other subscriber, said method comprising the step of:

manually updating the mobile information of the subscriber stored in the individual database thereof.

11. A method according to claim 10, further comprising the step of:

manually updating the mobile information of the other subscriber which is stored in the individual database of the subscriber.

* * * * *